United States Patent
Lyon et al.

[11] Patent Number: 6,028,841
[45] Date of Patent: Feb. 22, 2000

[54] DISTRIBUTED BUS THROTTLE AND METHOD

[75] Inventors: Norman Lyon, Hull; Eaizel Lakhani, Kanata, both of Canada

[73] Assignee: Nortel Networks Corporation, Montreal, Canada

[21] Appl. No.: 08/867,424

[22] Filed: Jun. 6, 1997

[51] Int. Cl.[7] ............................ H04J 3/16; H04J 3/22
[52] U.S. Cl. ............................ 370/232; 370/468
[58] Field of Search ............................ 370/232, 234, 370/235, 252, 451, 230, 420, 360, 362, 437, 438, 465, 468, 440, 445, 447, 448, 458

[56] References Cited

U.S. PATENT DOCUMENTS

| | | |
|---|---|---|
| 4,412,326 | 10/1983 | Limb .................................. 370/85 |
| 5,072,443 | 12/1991 | Hahne et al. ......................... 370/440 |
| 5,115,430 | 5/1992 | Hahne et al. ......................... 370/440 |
| 5,179,556 | 1/1993 | Turner .................................. 370/234 |
| 5,359,320 | 10/1994 | Jaffe et al. .......................... 370/825.5 |
| 5,381,407 | 1/1995 | Chao .................................. 370/234 |
| 5,381,413 | 1/1995 | Tobagi et al. ........................ 370/85.6 |
| 5,583,857 | 12/1996 | Souminya et al. .................... 370/233 |
| 5,650,997 | 7/1997 | Yang et al. .......................... 370/448 |
| 5,796,956 | 3/1995 | Jones ................................. 370/200.63 |
| 5,838,688 | 10/1996 | Kadambi et al. .................... 370/445 |

*Primary Examiner*—Chau Nguyen
*Assistant Examiner*—Phuongchau Ba Nguyen

[57] ABSTRACT

A distributed throttle for controlling the allocation of shared bus bandwidth to a number of data transmitting sources. Each source has a local throttle which monitors the amount of traffic on the bus, and generates a local maximum bandwidth allocation which is then self-imposed on the data transmitted by the source.

26 Claims, 6 Drawing Sheets

DISTRIBUTED BUS THROTTLE AND METHOD

FIELD OF THE INVENTION

The invention relates to methods and systems for allocating capacity on a shared bus.

BACKGROUND OF THE INVENTION

A shared bus is used to provide data communications between a number of traffic sources. Any shared bus will have a finite bandwidth or capacity which must be allocated to the sources in some manner. The grade of service that a particular source receives is a function of how much of the bandwidth that the bus allocates to that source. The grade of service will be good if the bus can guarantee a particular source the capacity to carry any data which it generates. In existing bus architectures it is difficult to change the underlying bus protocol to provide a guaranteed grade of service to a number of sources, particularly when the sources are of various different types. In a system which provides a "fair" allocation of resources, sources of the same type are guaranteed the same grade of service.

Statistical capacity allocation (or statistical multiplexing of bandwidth) can be used to exploit the fact that, statistically speaking, not all the traffic sources will be transmitting data at full capacity all the time. However, in the statistically rare event that the sources are transmitting more traffic than the bus can carry, the behaviour of the bus becomes unpredictable, and it is generally impossible to guarantee a predetermined grade of service to each source.

What is required is a bus capacity allocation method or system which prevents the overload on a shared bus in a way that permits statistical multiplexing of bandwidth, ensures that sources of the same type receive the same bandwidth, and permits an engineerable division of bandwidth between sources of different types. This translates into permitting different sources with different grades of service to co-reside on a shared bus, without concern for bus overload or source starvation. Statistical multiplexing provides a simple approach for sharing a medium. However, this approach does not guarantee a grade of service unless the sources are worst case engineered.

When worst-case engineering is employed, portions of the bandwidth are divided and permanently allocated to various traffic sources. This does not permit statistical multiplexing those portions of bandwidth and is hence very wasteful of bus resources.

A collision detection mechanism (such as used with ethernet for example) is another mechanism to arbitrate access on a shared medium. It however, faces problems with fairness between sources and has the disadvantage that the useable capacity will decrease as the load and number of users increase.

SUMMARY OF THE INVENTION

It is an object of the invention to obviate or mitigate one or more of the above identified disadvantages.

According to a first broad aspect, the invention provides in a network consisting of a plurality of traffic sources connected to a shared communications bus, a distributed throttle comprising a respective local throttle function for each of said plurality of traffic sources, each local throttle comprising: a bus observation device for making traffic observations on the bus; a throttle mechanism for controlling the rate of transmission of data by the respective traffic source on the bus as a function of the traffic observations.

According to a second broad aspect, the invention provides in a network consisting of a plurality of traffic sources connected to a shared communications bus, a distributed throttle comprising a respective local throttle for each of said plurality of traffic sources, each local throttle comprising: a bus observation device for observing a first value representative of the traffic on the bus; a compensation filter for filtering the first value to produce a second value representative of the traffic on the bus; a control mechanism for producing a bandwidth allocation control value as a function of the second value; and a throttle mechanism for controlling the rate of transmission of data by the respective traffic source on the bus so as to occupy less bandwidth than a value indicated by the bandwidth allocation control value.

According to a third broad aspect, the invention provides a traffic source connected to a shared communications bus, the traffic source comprising: a receiver for receiving data from the shared bus; a transmitter for transmitting data to the shared bus; a local throttle comprising: a) a bus observation device for making traffic observations on the bus; and b) a throttle mechanism for controlling the rate of transmission of data by the traffic source on the bus as a function of the traffic observations.

According to a fourth broad aspect, the invention provides a method of allocating capacity to a plurality of traffic sources connected to a shared bus comprising the steps of: a) each traffic source monitoring the bus and making bus observations; b) each traffic source determining a respective maximum bandwidth allocation for itself as a function of the bus observations; b) each traffic source controlling its own rate of data transmission on the shared bus to be less than or equal to its respective maximum bandwidth allocation.

The distributed throttle according to the invention solves the problem of providing a guaranteed grade of service to a number of traffic sources by attacking the source of traffic and not changing the underlying bus protocol. This makes it easily implementable in most shared bus architectures in an incremental fashion.

This invention increases the usable bandwidth in a shared bus architecture by eliminating the need to worst-case engineer traffic sources, and by allowing for grade of service based statistical engineering. This invention will provide minimum guarantees of performance for services while supporting statistical engineering.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
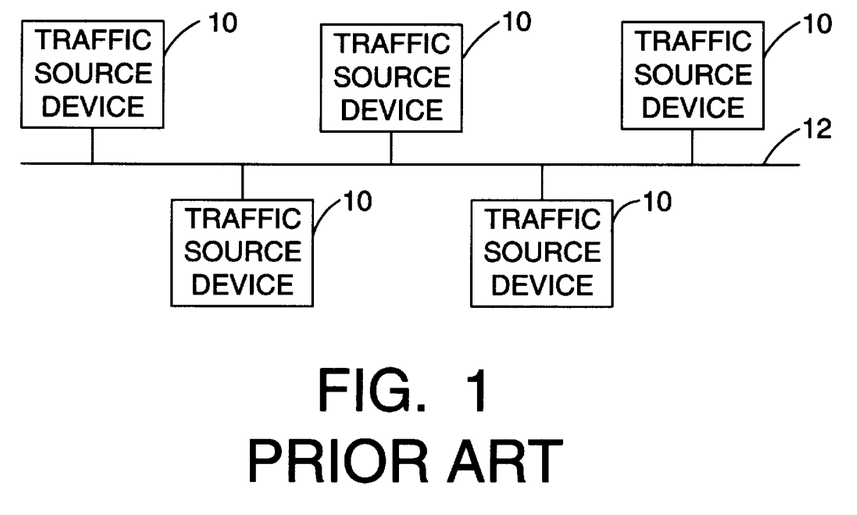
FIG. 1 is a block diagram of a conventional shared bus architecture.

Referring firstly to FIG. 1, shown is a conventional network consisting of a number of traffic source devices 10 connected to a shared bus 12. The devices 10 might be workstations for example. Some underlying bus protocol is controlling the bus 12.

Figure 2:
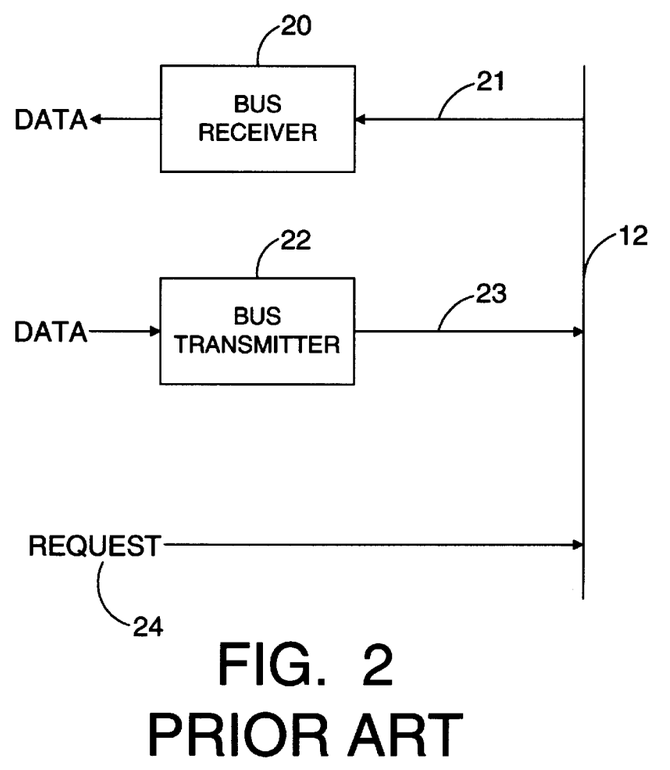
FIG. 2 is a block diagram of Et conventional bus access system.

Referring now to FIG. 2, which is a block diagram of a device 10 featuring conventional bus access, conventionally each device includes a bus receiver 20 and a bus transmitter 22 connected to receive incoming data 21 and transmit outgoing data 23 from and to the bus 12. A transmit queue (not shown) is used to queue up data packets of arbitrary size for transmission over the bus 12. To send a packet, the device generates a request 24 for access to the bus 12. An arbiter (not shown) receives the request 24 and allocates access.

According to an embodiment of the invention, a distributed bus throttle is used in a network such as the one shown in FIG. 1 to control the allocation of the bandwidth of the bus 12 to the devices 10. The distributed bus throttle is distributed in the sense that the functionality to implement the bus throttle is located on each of the devices 10.

Figure 3:
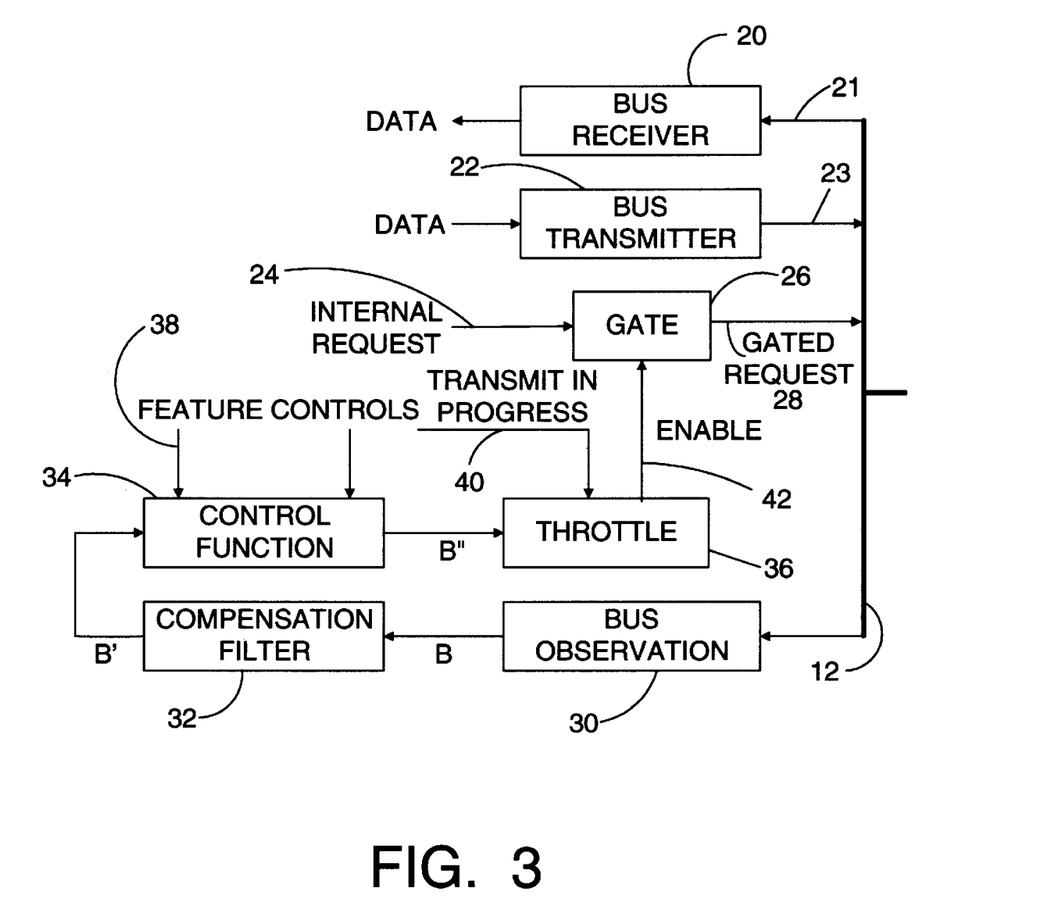
FIG. 3 is a block diagram of a bus access/capacity allocation system according to an embodiment of the invention.

FIG. 3 is a block diagram of a device 10 featuring bus access functionality and bus capacity allocation according to an embodiment of the invention. In addition to the conventional bus receiver 20, and bus transmitter 22, there are provided the functions required to implement the distributed bus throttle according to an embodiment of the invention. These include a gate 26, and connected together in sequence, a bus observation block 30 connected to the bus 12, followed by a compensation filter block 32, a control function 34, and a throttle block 36 connected to, the gate 26. The control function 34 has feature control inputs 38 while the throttle block 36 has a "transmit in progress" input 40 and produces an enable/disable output 42 which functions as a control input to the gate 26.

The gate 26 is connected between the internal requests 24 and the bus 12. The gate generates gated requests 28 which are sent to the bus 12.

The bus observation block 30 is responsible for continuously observing the bus 12 and its current instantaneous bus state B, which is either busy or idle, and inputs this to the compensation filter block 32. The bus observation block 30 connects to the bus and hence observes all bus activity including activity due to other sources.

The compensation filter block 32 filters the instantaneous bus state B to produce a parameter B', and is designed to ensure stability of the overall system response, while being as responsive as possible. A form of low-pass filter may be used to implement the compensation filter block 32 in which case the output B' can be thought of as representing the short-term current average occupancy of the bus. This current average occupancy B' is input to the control function 34. The specific form of the compensation filter block 32 is not critical to the throttle; it may be analog or digital, and in the latter case, IIR or FIR (Infinite Impulse Response or Finite Impulse Response). Since a low-cost DSP (Digital Signal Processor) design is desirable, preferably an IIR digital filter is used. A second order filter of this type can be implemented with a difference equation of the form $$y_n = a_o x_n + a_1 x_{n-1} + a_2 x_{n-2} + b_1 y_{n-1} + b_2 y_{n-2}.$$

In the above equation $x_i$ are the values input to the compensation filter block 32 and $y_i$ are the values output. The exact coefficients must be optimized while considering many system specific details (number of sources, control functions breakpoints, minimum and maximum bandwidth, and desired transient performance). The coefficients may be selected to optimize stability or response time, for example. Techniques for selecting filter parameters to optimize certain parameters are well known in the art and are not described in detail here.

The control function 34 generates a control value B" which is input to the throttle block 36 which is based on the current average occupancy B' and the feature controls 38. The feature controls 38 permit customisation of this particular device's response with respect to another device having different feature controls. This allows different priorities of devices to be defined, for example.

Another highly preferable characteristic of the control function 34 is that it is memoryless in order to ensure equivalent responses from equivalently configured devices (i.e. fairness). The distributed nature of the implementation makes it likely that the control functions 38 on equivalent devices will experience slightly different stimuli. The use of long-term memory, such as an integrator, can cause deviation or drift in the responses of equivalent devices such that the total bus utilization remains correctly limited, but the bandwidth is not fairly distributed.

Figure 4:
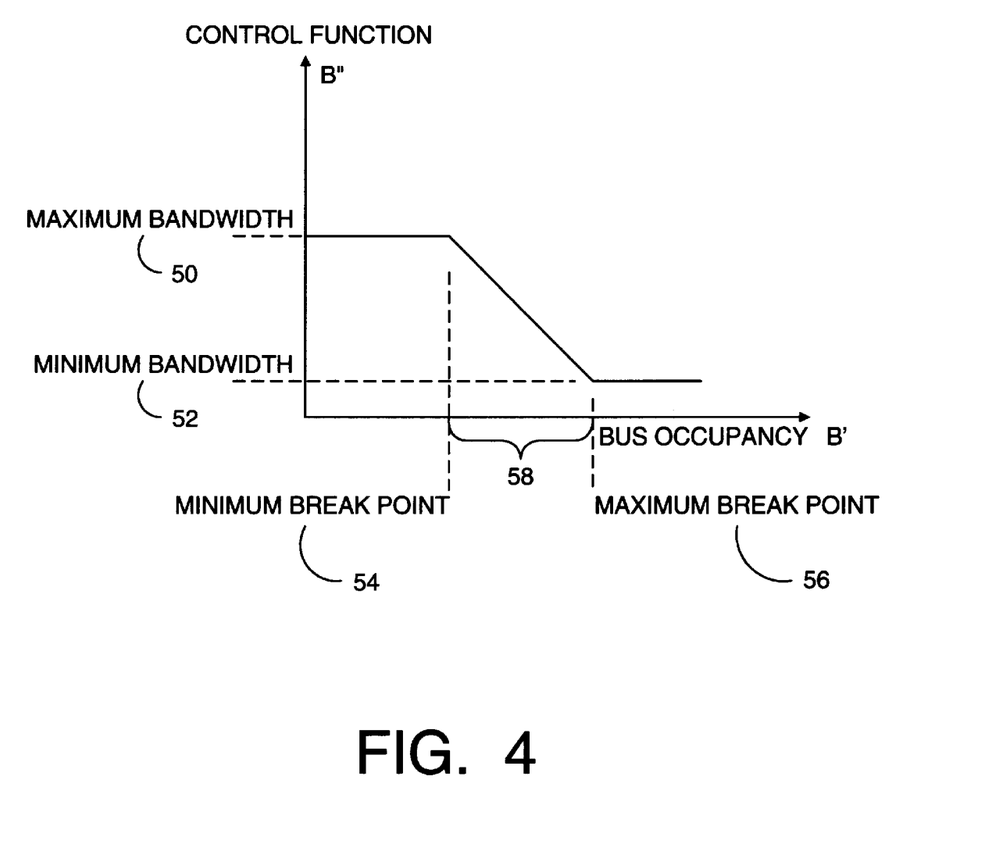
FIG. 4 is an example of a control function used in the system of FIG. 3.

The output B" of the control function 34 may be thought of as an instantaneous bandwidth allocation for that device. B" might be an actual bandwidth or a normalized bandwidth allocation, for example. A normalized bandwidth allocation would provide the allocated bandwidth as a fraction of the total bus capacity. An example of a control function 34 is shown in FIG. 4. The function plots the output B" of the control function 34 (instantaneous bandwidth allocation) as a function of the current average occupancy estimate B' received from the compensation filter block 32. This particular function allows four parameters to be specified per device 10, these being the minimum and maximum bandwidth parameters 50, 52, and minimum and maximum break points 54,56. The minimum and maximum bandwidth parameters 50,52 control the limits of how much bandwidth the device 10 will be able to consume with its transmissions. The minimum breakpoint 54 determines at what bus occupancy the control function 12 in the particular device 10 begins to decrease its instantaneous bandwidth allocation B" in a linear fashion, while the maximum breakpoint 56 determines at what bus occupancy the control function in the particular device 10 stops decreasing its instantaneous bandwidth allocation B". The minimum and maximum break points 54,56, when considered across all devices 10, determine relative priority by controlling which devices are first to begin to close their throttles and which devices are last to close their throttles down to the minimum bandwidth.

The existence of a non-zero transition region 58 between the break points is a consequence of keeping the function memoryless. The width of the transition region 58 and the number of devices 10 present impacts the design of the compensation filter block 32.

Referring again to FIG. 3, the throttle block 36 reads the control value B" generated by the control function 38, and attempts to regulate the outgoing data 23 so as to not exceed the instantenous bandwidth indicated by the control value B". In order to do this, the throttle block 36 needs to be able to disable and enable the transmission of outgoing data 23, as well as measure how much outgoing data the device 10 transmits when enabled. The level of granularity of this control is essentially implementation specific, but can effectively be at the bit, byte, word, burst or packet levels.

The arbiter (not shown) receives the gated requests 28 and allocates access on the basis of the gated requests. The gate 26 is interposed between the device's internal request 24 and the arbiter, thus allowing the throttle to hide the internal request 24 from the arbiter until the throttle deems it appropriate to pass it through. No change to the arbiter functionality is required.

Figure 5A:
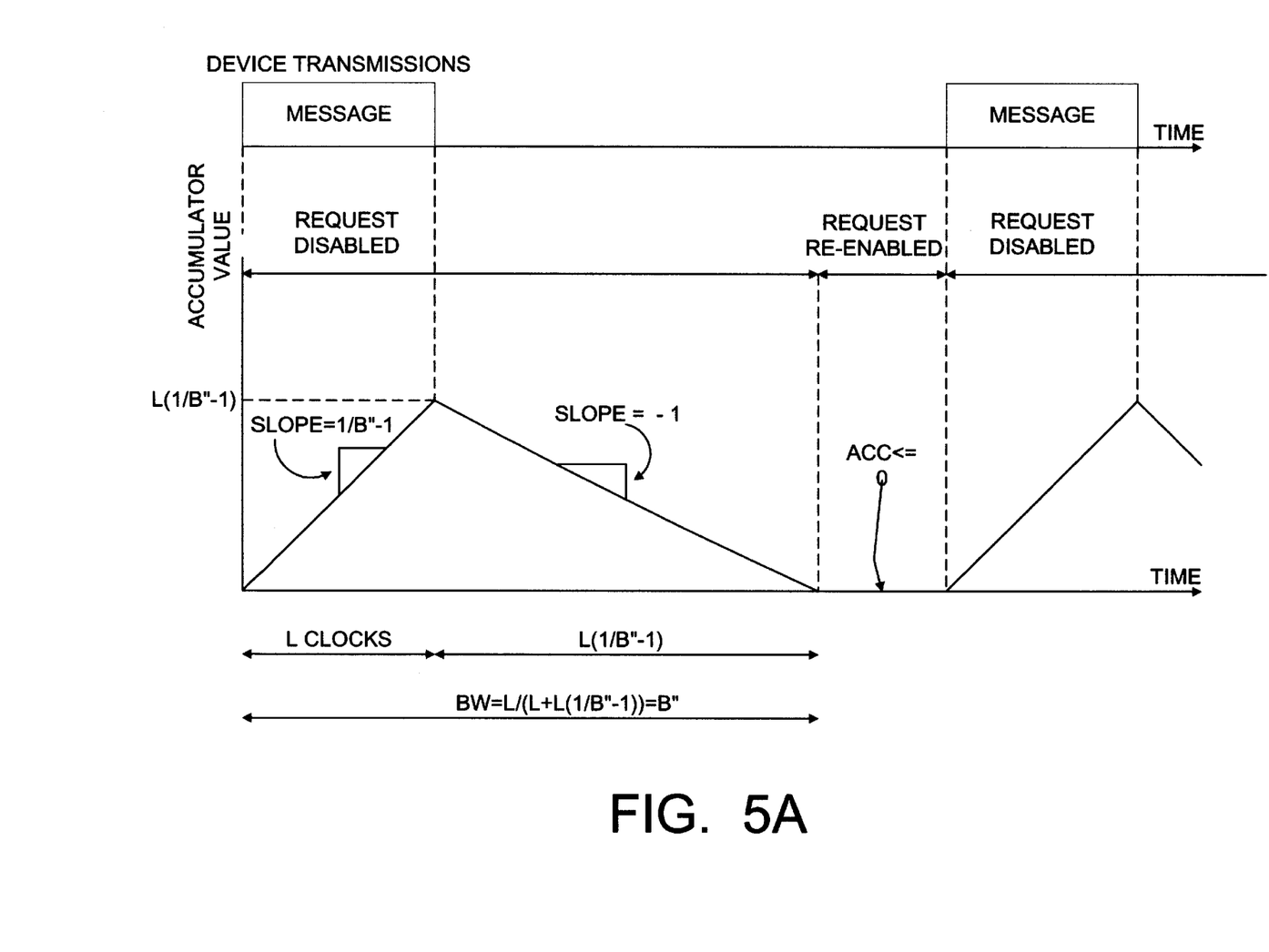
FIGS. 5A–5B are examples of packet-based throttle mechanisms used in the system of FIG. 3.

If it is assumed the device 10 normally transmits outgoing data 23 consisting of packets or variable-length bursts, one per internal request 24, then a simple way to achieve the desired throttling is to use a "leaky bucket mechanism" for example as shown in FIG. 5A. In this example, instead of having the control function 34 return a control value that is a bandwidth B", ar increment factor 1/B"−1 is computed, and this is passed to the throttle block 36. Here it is assumed that B" is a normalized bandwidth as discussed previously. For this particular example, it is also assumed that time is divided into clock cycles by a system clock (not shown), or by a clock on the bus. However, other intervals may be used to determine the increment/decrement intervals such as bit, byte or word intervals etc. The throttle is then embodied as an accumulator, in which a subtotal is incremented by the throttle block 36 by this increment factor for every clock cycle that the device 10 is transmitting until the complete burst has been transmitted. The transmit in progress input 40 is used by the throttle block 36 to know for how long data is being transmitted. When the complete burst has been transmitted, the throttle block 36 disables the gate 26 by sending a disables signal on the enable/disable output 42 to prevent internal requests 24 from being passed through to the arbiter. Then the throttle block 36 decrements the accumulator by one increment factor for every clock cycle after the burst is completely transmitted (as indicated by the transmit in progress signal 40) and until the accumulator reaches zero. At this point, the throttle block 36 re-enables the gate 26 to allow internal requests 24 to be passed to the arbiter.

The result of this scheme is that even though packets are bursted onto the bus 12 at high speed, the device 10 is prevented from sending another packet until such time that the average bandwidth due to the previous packet equals the bandwidth limit the throttle block 36 is trying to a enforce.

Figure 5B:
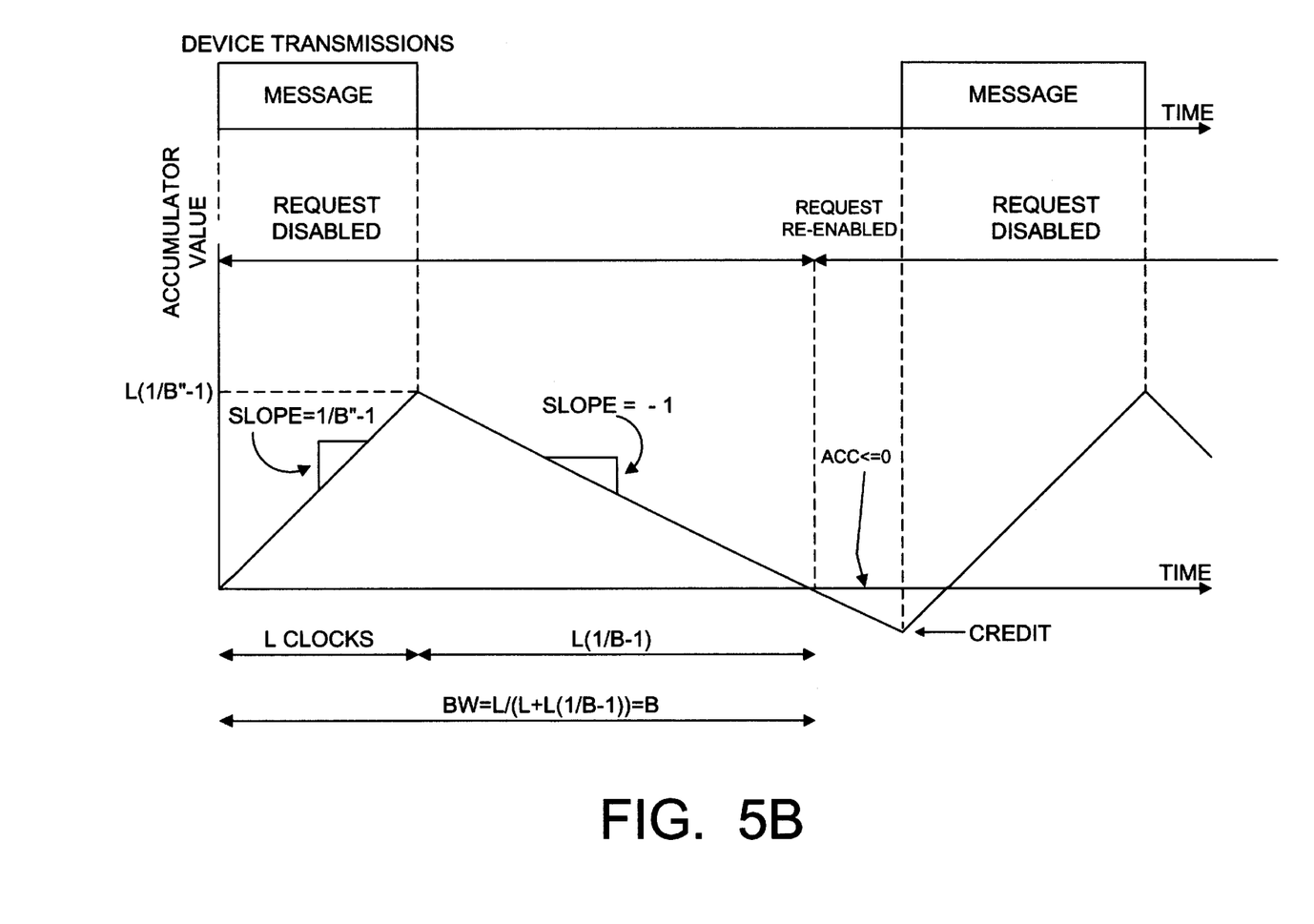

In the above described example, it is assumed that the accumulator is not decremented below zero. However, preferably, for best accuracy in accounting for arbitration delays (which may be especially long in collision backoff system, e.g. ethernet) the accumulator can be allowed to continue decrementing to negative values. A negative accumulator value, in effect, represents a credit that will be used to reduce the delay after the next burst, thus allowing the device to attain a bandwidth of B" in spite of additional arbitration delays. If the negative counting is allowed only when the device has a pending request, then its peak bandwidth is limited to B". If however, negative counting is permitted independent of a pending request, then a new behaviour is obtained where the device can burst above B" for some period of time, if this is desirable. In the latter case, the magnitude of the burst is controlled by limiting how negative the accumulator may go. An example of this is shown in FIG. 5B.

Figure 6A:
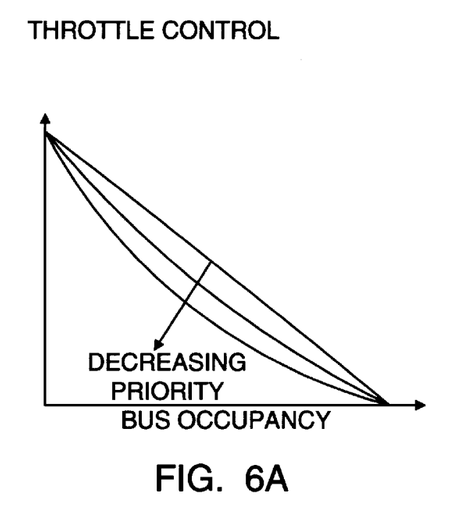
FIGS. 6A–6C are further examples of control functions for use in the system of FIG. 3.
Figure 6B:
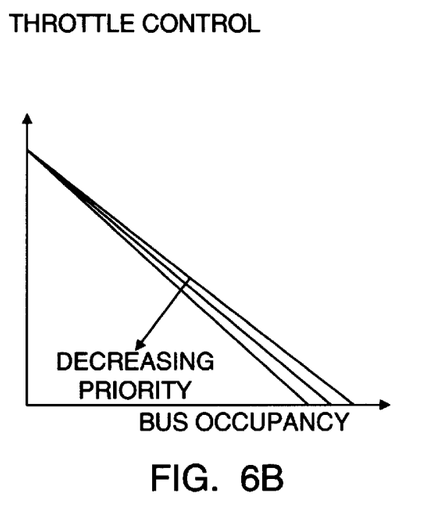
Figure 6C:
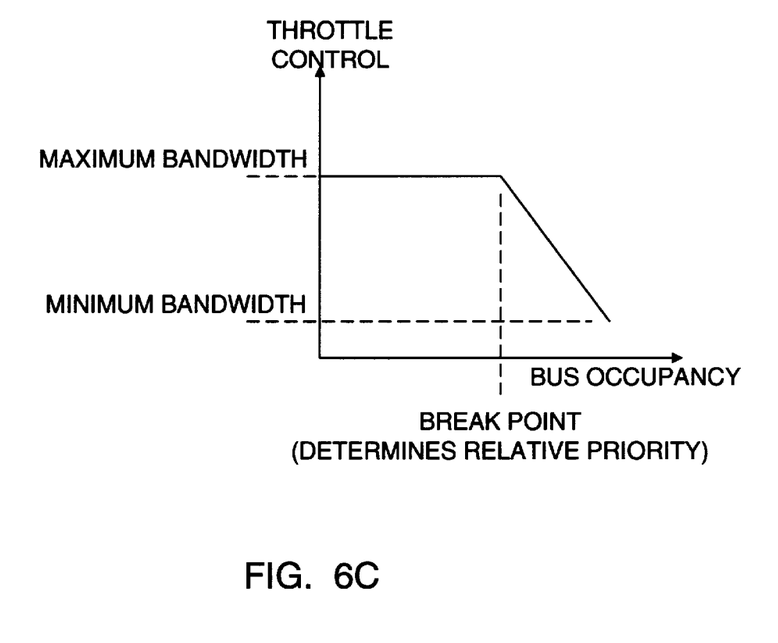

The control function 34 previously described with reference to FIG. 4 is feature-rich, having four parameters that relate to easily-understood quantities, while being relatively easy to compute, since it is piece-wise linear. While it is to be understood that there are essentially an unlimited number of control functions 34 which may be applied with this invention, there are some simple control functions which are of particular interest because they are less complex to implement in high-speed designs. Some examples of simple control functions are shown in FIGS. 6A–6C.

Additionally, instead of restricting the implementation to a specific class of function, a table-lookup scheme could be implemented, which leaves the exact form of the control function 34 arbitrarily specifiable.

As explained earlier, a memoryless control function 26 offers the best immunity to signal errors and noise that arise due to the distributed nature of the overall system. There are some exceptions to this, however.

For example, the transition region 58 of the control function 34 shown in FIG. 4 may be eliminated by the use of an integrator. If the system is fully digital, and the operation of all throttles across all devices is fully synchronized, this would guarantee that all control functions see identical stimuli. Typically, however, this is very difficult to achieve, and would not cover the case of a new device added to the bus after other devices had been in operation and modified their memory state.

A more realistic approach would be to design a memory effect of finite duration (unlike an integrator, which has an infinite duration effect). Such a memory may be thought of as a "leaky" integrator, since it has an inherent bias to return to a preset value. The strength of this bias would generally determine the magnitude and duration of the response deviation for a given stimuli deviation. Such an approach offers a compromise between reduced fairness and improved capacity (by reducing the control function transition region).

It is an advantage of the distributed throttle according to the invention that each device be guaranteed a minimum grade of service. This minimum grade of service must be large enough for each source to survive. In the example control function of FIG. 4, each device is guaranteed a minimum grade of service equal to the minimum bandwidth. This imposes a constraint on the minimum bandwidth allocations. If the maximum total traffic capacity of the bus is M, and the minimum bandwidth allocation for each device is $m_i$, i=1 to N, where N is the number of sources, then the following constraint must be satisfied in order to be able to guarantee the minimum bandwidth allocations to all the sources:

$$\sum_{i=1}^{N} m_i \leq M.$$

In general, the device may compete a slightly different estimate of the bus occupancy $B'_i$, but these estimates should be close to the actual bus occupancy $B'_{actual}$. In general, the bandwidth allocations $B''_i$ will increase as the bus occupancy decreases. This of course results in an over-allocation of bus capacity as expressed by the equation $$\sum_{i=1}^{N} B''_i > M.$$

This is statistical bandwidth engineering. Since the bus occupancy is low, a higher bandwidth can be allocated by each device since it is statistically unlikely that many of the devices will transmit at this higher allocated bandwidth. This results in a much more efficient use of bandwidth than if the sum of all the allocated capacities were constrained to always be less than or equal to the maximum capacity of the bus.

In some systems, it may not be practical to interpose the gate on the internal request/grant control path. In these cases, the gate may be substituted by a buffer block that is interposed on the output data path. The buffer would intercept outgoing data being sent to the bus, and the buffer on to the bus would be drained at a controlled rate.

The compensation filter block offers an opportunity to implement adaptive control techniques that could compensate for varying characteristics such as traffic burstiness and system transient response.

For example, a fixed compensation filter is designed to ensure stability considering the narrowest transition region width and the maximum number of devices that will share the bus. When the actual system configuration deviates significantly from this, the system may under perform, having slow response and brief bus overloads. An adaptive control scheme might be devised that adjusts in real-time the compensation filter's characteristics to improve its response.

When the devices sharing the bus are considered a single system, it may be advantageous to have a general purpose device controller on the device so that dynamic parameter changes may be made to the feature controls 38 being input to the control function 34.

The utility of this is further enhanced when there also exists a centralized system controller, so that such parameter changes may be made to reflect changes in the system state, such as its provisioning information. For example, if devices are added or removed from the bus, or the type of traffic and applications supported by existing devices changes, then a centralized controller may automatically update all device controllers with appropriate new parameters.

As part of a preferred embodiment, a DSP (Digital Signal Processor) may be used to implement the control function and the compensation filter block. This is possible because these functions are less real-time critical than the bus observation block and throttle block functions, and can run at a sampling rate independent from the bus rate.

The advantage of this is the flexibility the DSP offers. Performance enhancements and product evolution can be well supported if the DSP's program is part of the device's software load. The DSP may also facilitate the introduction of adaptive control, and may also function as a device controller as described above.

Numerous modifications and variations of the present invention are possible in light of the above teachings. It is therefore to be understood that within the scope of the appended claims, the invention may be practised otherwise than as specifically described herein.

In the above described embodiments it is assumed that the bus observation block is making continuous observations of the bus state. Alternatively, the observation block may, for example, aggregate busy bus cycles over some number of total bus cycles (a window) and present the total busy cycle count per window to the compensation filter in order to accommodate a high rate bus and facilitate the implementation of a compensation filter on a lower speed DSP. It is contemplated that many different ways of obtaining bus state/traffic information may by used within the scope of the invention.

It is noted that as a consequence of introducing the throttle to an existing design, request accesses are delayed by some additional amount. Some systems may have a watchdog timer intended to detect a device that is forced to wait too long for the bus, and to generate a timeout error when this occurs. The introduction of the throttle to such a system may cause such timeouts to occur more frequently, especially if a device has a very low minimum bandwidth. This issue should be addressed by recognizing this possibility, and treating the timeouts as a possible normal event, instead of as a serious error.

A particular throttle implementation has been described in which an accumulator is incremented and decremented and the state of the accumulator determines whether internal requests to the bus are to be passed to the arbiter. Many other schemes for achieving this may be envisioned and are considered to fall within the scope of the invention.

The embodiments of the invention in which an exclusive property or privilege is claimed are defined as follows:

1. In a network consisting of a plurality of traffic sources connected to a shared communications bus, a distributed throttle comprising a respective local throttle function for each of said plurality of traffic sources, each local throttle comprising:
   a bus observation device for making traffic observations on the bus;
   a throttle mechanism for controlling the rate of transmission of variable length bursts of data by the respective traffic source on the bus as a function of the traffic observations pails as a function of the length of the variable length bursts.

2. A distributed throttle according to claim 1 wherein the traffic observations consist of bus state observations, the bus state being either busy or idle.

3. A distributed throttle according to claim 2 wherein each local throttle further comprises a compensation filter which processes the bus state observations and produces an estimate of the instantaneous average traffic on the bus, wherein the throttle function controls the rate of transmission as a function of the estimate of the instantaneous average traffic on the bus.

4. In a network consisting of a plurality of traffic sources connected to a shared communications bus, a distributed throttle comprising a respective local throttle function for each of said plurality of traffic sources, each local throttle comprising:
   a bus observation device for making traffic observations an the bus, the traffic observations comprising bus state observations, the bus state being either busy or idle;
   a compensation filter which processes the bus state observations and produces an estimate of the instantaneous average traffic on the bus;
   a throttle mechanism for controlling the rate of transmission of data by the respective traffic source on the bus as a function of the estimate of the instantaneous average traffic on the bus;
   wherein in each local throttle, the respective throttle mechanism controls the rate of transmission to be less than a respective target transmission rate, the respective target transmission rate being a function of the estimate of the instantaneous average traffic on the bus.

5. A distributed throttle according to claim 4 wherein in each local throttle, the respective target transmission rate is set to a respective target maximum value for the respective estimate of the instantaneous average traffic less than an estimate minimum, and the respective target transmission rate is set to a respective target minimum for the respective estimate of the instantaneous average traffic greater than an estimate maximum.

6. A distributed throttle according to claim 5 wherein each respective target transmission rate decreases linearly between the respective maximum and minimum.

7. In a network consisting of a plurality of traffic sources connected to a shared communications bus, a distributed throttle comprising a respective local throttle for each of said plurality of traffic sources, each local throttle comprising:
   a but observation device for observing a first value representative of the traffic on the bus;
   a compensation filter for filtering the first value to produce a second value representative of the traffic on the bus;

a control mechanist for producing a bandwidth allocation control value as a function of the second value; and a throttle mechanism for controlling the rate of transmission of variable length bursts of data by the respective traffic source on the bus so as to occupy less bandwidth than a value indicated by the bandwidth allocation control value.

8. A distributed throttle according to claim 7 wherein the first value is representative of the state of the bus, this being either busy or idle.

9. A distributed throttle according to claim 8 wherein the second value is representative of the instantaneous traffic on the bus.

10. A distributed throttle according to claim 7 wherein the bandwidth allocation control value is a maximum bandwidth the particular source is allowed to use with its data transmissions.

11. A distributed throttle according to claim 7 wherein each control mechanism has respective control factor inputs which determine the function used to compute the bandwidth allocation control value from the second value.

12. A distributed throttle according to claim 7 wherein each source has a respective gate having an enable and disable state, and each source generates an internal request to the gate when it wants to transmit a packet of data in response to which the gate generates a gated request. to the bus when it is in its enabled state, and the respective throttle mechanism enables or disables the gate so as to control the amount of bandwidth being occupied by the transmitted data to be less than the value indicated by the bandwidth allocation control value.

13. A distributed throttle according to claim 7 wherein each throttle mechanism has an input generated by the respective source which indicates when data is being transmitted by that source, and the throttle mechanism uses this to determine the amount of bandwidth the source is occupying during its transmission of a variable length packet of data.

14. A distributed throttle according to claim 11 further comprising a central controller which is connected to each control function for setting the control factor inputs.

15. A distributed throttle according to claim 7 wherein each compensation filter is an adaptive filter.

16. A traffic source connected to a shared communications bus, the traffic source comprising:

a receiver for receiving data from the shared bus;

a transmitter for transmitting data to the shared bus;

a local throttle comprising:

a) a bus observation device for making traffic observations on the bus; and b) a throttle mechanism for controlling the rate of transmission of variable length bursts of data by the traffic source on the bus as a function of the traffic observations and on the length of the variable length burst.

17. A traffic source according to claim 16 wherein the traffic observations consist of bus state observations, the bus state being either busy or idle.

18. A traffic source connected to a shared communications bus, the traffic source comprising:

a receiver for receiving data from the shared bus;

a transmitter for transmitting data to the shared bus;

a local throttle comprising:

a) a bus observation device for making traffic observations on the bus consisting of bus state observations, the bus state being either busy or idle; and b) a throttle mechanisms for controlling the rate of transmission of data by the traffic source on the bus as a function of the traffic observations.

c) a compensation filter which processes the bus state observations and produces an estimate of the instantaneous average traffic on the bus, and wherein the throttle mechanism controls the rate of transmission as a function of the estimate of the instantaneous average traffic on the bus.

19. A traffic source according to claim 18 wherein the throttle mechanism controls the rate of transmission to be less than a target transmission rate, the respective target transmission rate being a function of the estimate of the instantaneous average traffic on the bus.

20. A traffic source according to claim 19 wherein the target transmission rate is set to a target maximum value for the estimate of the instantaneous average traffic less than an estimate minimum, and the respective target transmission rate is set to a target minimum for the estimate of the instantaneous average traffic greater than an estimate maximum.

21. A traffic source according to claim 18 wherein the throttle mechanism comprises a leaky bucket mechanism.

22. A traffic source connected to a shared communications bus, the traffic source comprising:

a receiver for receiving data from the shared bus;

a transmitter for transmitting data to the shared bus;

a local throttle comprising:

a) a bus observation device for making traffic observations on the bus; and b) a throttle mechanism for controlling the rate of transmission of data by the traffic source on the bus as a function of the traffic observations, the throttle mechanism comprising a leaky bucket mechanism;

wherein data is transmitted in variable length packets, and wherein time is divided into increment/decrement intervals, and for each increment/decrement interval during the transmission of a variable length packet an accumulator is incremented by a first predetermined amount and for each increment/decrement interval that the transmitter is not transmitting data the accumulator is decremented by a second predetermined amount and wherein transmission is disabled while the accumulator is being decremented.

23. A traffic source according to claim 22 wherein the increment/decrement intervals are determined by clock cycles of a system clock.

24. A traffic source according to claim 22 wherein the first predetermined amount is equal to 1/B−1 where B is the fraction of the total bandwidth to be allocated to that source, and the second predetermined amount is one.

25. A traffic source according to claim 22 wherein the accumulator is not permitted to become negative.

26. A traffic source according to claim 22 wherein the accumulator is permitted to become negative, thereby allowing bandwidth credit to be accumulated.

* * * * *